United States Patent [19]

Kolb

[11] Patent Number: 5,509,296

[45] Date of Patent: Apr. 23, 1996

[54] ARRANGEMENT FOR THE STATIONARY LEAK TESTING OF TANK VENTING SYSTEMS

[75] Inventor: Hartmut Kolb, Ludwigsburg, Germany

[73] Assignee: Mercedes-Benz A.G., Stuttgart, Germany

[21] Appl. No.: 358,525

[22] Filed: Dec. 19, 1994

[30] Foreign Application Priority Data

Jan. 15, 1994 [DE] Germany .......................... 44 01 085.0

[51] Int. Cl.$^6$ ........................................ G01M 3/26
[52] U.S. Cl. ................. 73/40.5 R; 73/49.2; 73/40.7; 73/49.7
[58] Field of Search ........................ 73/40, 40.5 R, 73/49.2 R, 49.2 T, 49.7, 118.1

[56] References Cited

U.S. PATENT DOCUMENTS

| | | | |
|---|---|---|---|
| 5,107,698 | 4/1992 | Gilliam | 73/40.7 |
| 5,146,902 | 9/1992 | Cook et al. | 73/40 X |
| 5,187,974 | 2/1993 | Mellits et al. | 73/49.7 |
| 5,369,984 | 12/1994 | Rogers et al. | 73/49.2 |
| 5,408,866 | 4/1995 | Kawamura et al. | 73/40 |
| 5,425,266 | 6/1995 | Fournier | 73/49.7 |

FOREIGN PATENT DOCUMENTS

| | | |
|---|---|---|
| 4124465 | 1/1993 | Germany . |
| 4203100 | 8/1993 | Germany . |

*Primary Examiner*—Michael J. Brock
*Attorney, Agent, or Firm*—Klaus J. Bach

[57] ABSTRACT

In an arrangement for determining leaks in a tank venting system of a motor vehicle which includes a fuel tank, an adsorption filter in communication with the fuel tank, a venting pipe, a regeneration pipe connecting the adsorption filter to the intake manifold of an internal combustion engine, the venting pipe extends to an area adjacent the filler neck of the fuel tank and a test apparatus is provided with a test pipe having a seal sleeve for placement over the tank filler neck and the end of the venting pipe for applying pressure to the tank venting system by means of pumps disposed in the test apparatus and the test apparatus further includes a pressure sensor for determining the pressure in the tank venting system and a control device for controlling application of pressure to the venting system and for the evaluation of the pressure values determined by the pressure sensor for indicating a leak in the venting system.

4 Claims, 2 Drawing Sheets

ARRANGEMENT FOR THE STATIONARY LEAK TESTING OF TANK VENTING SYSTEMS

BACKGROUND OF THE INVENTION

The invention relates to an arrangement for the stationary determination of leaks in a tank venting system installed in a vehicle with an internal combustion engine by which the venting system can be checked when the vehicle is not operated.

DE-OS 42 03 100 discloses an arrangement for the testing of the operation of a tank venting system of a vehicle with internal combustion engine. Herein functional testing is performed on board, that is, during vehicle operation. For that purpose the regeneration valve is opened for a predetermined period under predetermined operating conditions such that the vacuum existing in the engine induction manifold is applied to the tank venting system. Subsequently the vacuum achieved in the tank venting system is measured and the vacuum build-up gradient is determined. Then the regeneration valve is closed and, again after a given period, the remaining residual pressure is measured from which the pressure restitution gradient is determined. The quotient of the vacuum build-up and the pressure restitution gradients are then compared with a threshold value and a functional fault condition is indicated it the quotient exceeds the threshold value.

DE 41 24 465 A1 discloses a similar arrangement wherein pressurized air needed for leak testing is provided by a pressurized air source carried in the vehicle. However such on-board diagnosis arrangements are involved and expensive. In addition it is not possible with these arrangements to determine the size and location of a leak. It is the principal object of the present invention to provide an apparatus for the stationary determination of the soundness of a vehicle tank venting system with which leaks can be easily and reliably detected and also be located.

SUMMARY OF THE INVENTION

In an arrangement top determining leaks in a tank venting system of a motor vehicle which includes a fuel tank, an adsorption filter in communication with the fuel tank, a venting pipe, a regeneration pipe connecting the adsorption filter to the intake manifold or an internal combustion engine, the venting pipe extends to an area adjacent the filler neck of the fuel tank and a test apparatus is provided with a test pipe having a seal sleeve for placement over the tank filler neck and the end of the venting pipe for applying pressure to the tank venting system by means of pumps disposed in the test apparatus and the test apparatus further includes a pressure sensor for determining the pressure in the tank venting system and a control device fop controlling application or pressure to the venting system and for the evaluation or the pressure values determined by the pressure sensor for indicating a leak in the venting system.

Stationary testing apparatus have the advantage that they can be quite involved without increasing the costs for every single vehicle. They also can provide for more accurate and more reliable test results. With them it is possible, on one hand, to verity in a garage leaks determined with on-board equipment. On the other hand it is also possible to perform the stationary tests regularly during vehicle assembly, during service in garages or during the safety and emission inspections so that on-board testing could be totally omitted.

By arrangement of a venting pipe in the area of the fuel filter tube end it is possible to cover with the test pipe, which is provided with a seal gasket, both the tank filling hole as well as the vent pipe opening. Since also the regeneration valve is normally closed when the engine is not operating all connections of the tank venting system with the environment are then closed. After completion of the test the venting pipe is automatically opened by the removal of the test pipe. In this manner it is prevented that, as a result of a stuck or unintentionally closed venting valve, the tank is damaged or even destroyed.

The stationary leak test further has the advantage that the operating parameters can be held constant during the whole testing procedure. In addition it is possible in a simple manner to determine additional operating parameters such as fuel temperature and fuel level in the tank. With these parameters it is furthermore possible to determine the size of a leak. Finally colored pressurized gas may be admitted to the vent pipe so that a leak can be easily and rapidly located.

The invention is described below in greater detail on the basis of the enclosed drawings.

DESCRIPTION OF A PREFERRED EMBODIMENT

Figure 1:
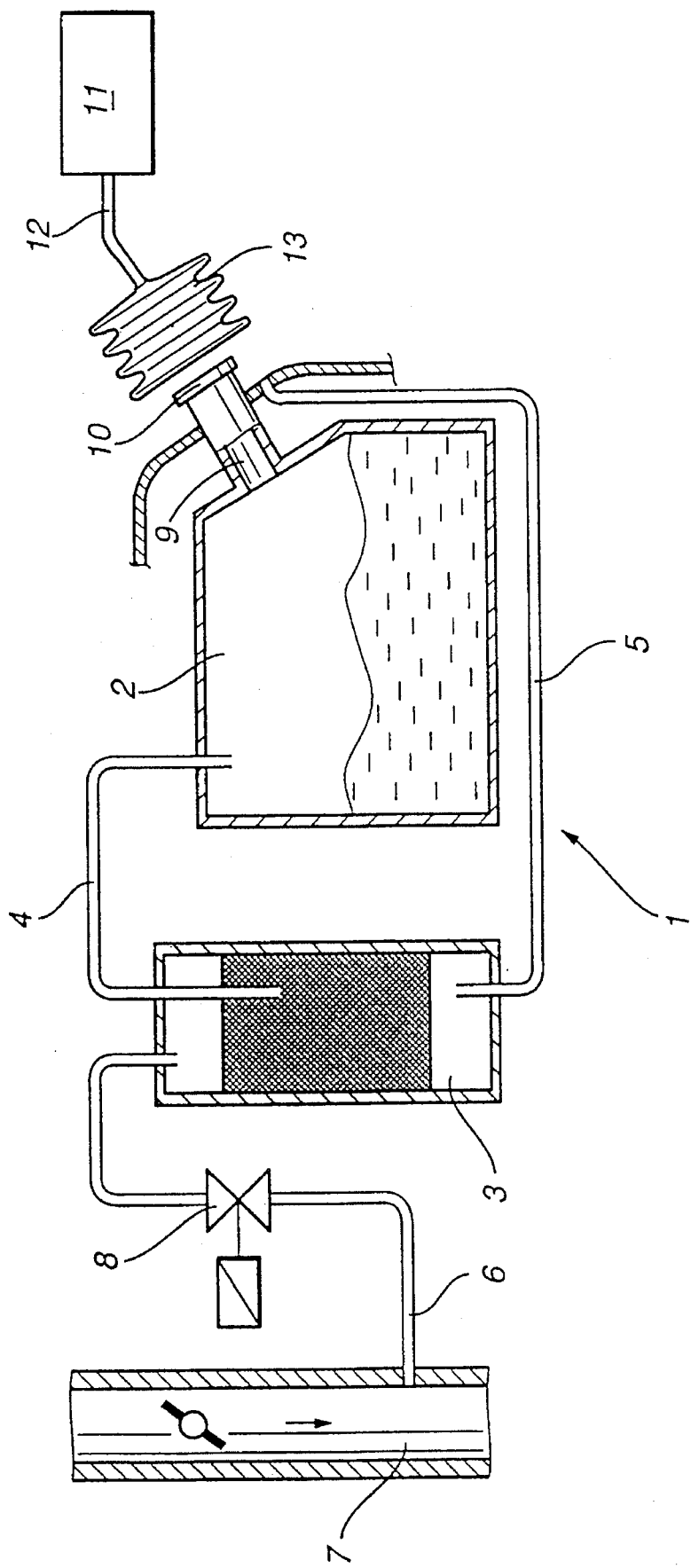
FIG. 1 is a schematic representation of the arrangement for leak testing a tank venting system.

The venting arrangement is designated in FIG. 1 generally by reference numeral 1. It includes a fuel tank 2 and an adsorption filter 3. The fuel tank 2 is connected to the adsorption filter 3 by a communication duct 4. The adsorption filter 3 is furthermore in communication with the environment via a venting pipe 5 and, via a regeneration pipe 6, with an inlet duct 7 of an internal combustion engine which is not shown in detail. The regeneration pipe 6 includes a regeneration valve 8 by means of which communication between the adsorption filter 3 and the inlet duct 7 can be interrupted or opened for the removal of the fuel vapors stored in the adsorption filter. The regeneration valve 8 is closed when it is not energized so that the escape of fuel vapors via the inlet duct is prevented when the vehicle is shut down. The venting pipe 5 ends in the area of the tank filler neck 9 which can be closed by a tank lid 10.

A testing apparatus 11 which includes a pump, a pressure sensor, a clock and a control unit can be connected to the vehicle by means of a test pipe 12 provided with a seal sleeve 13. For testing the venting system first the tank lid 10 is removed. When the test pipe 12 with the seal sleeve 13 is placed onto the fuel filler neck 9, it covers the filler neck 9 as well as the opening of the venting pipe 5. Since also the regeneration valve 8 is closed when the engine is shut down, connection of the testing apparatus 11 automatically closes all openings of the tank venting system to the environment. After completion of the test the venting pipe 5 is again opened by the removal or the test pipe 12.

Prior art tank venting systems require a shut-off valve for closing the venting pipe. The use of such a valve, however, entails the risk that the tank is damaged or even destroyed as a result of a jammed or inadvertently closed vent pipe shut-off valve. This risk is avoided when the open end of the venting pipe is arranged as proposed by the present invention.

Figure 2:
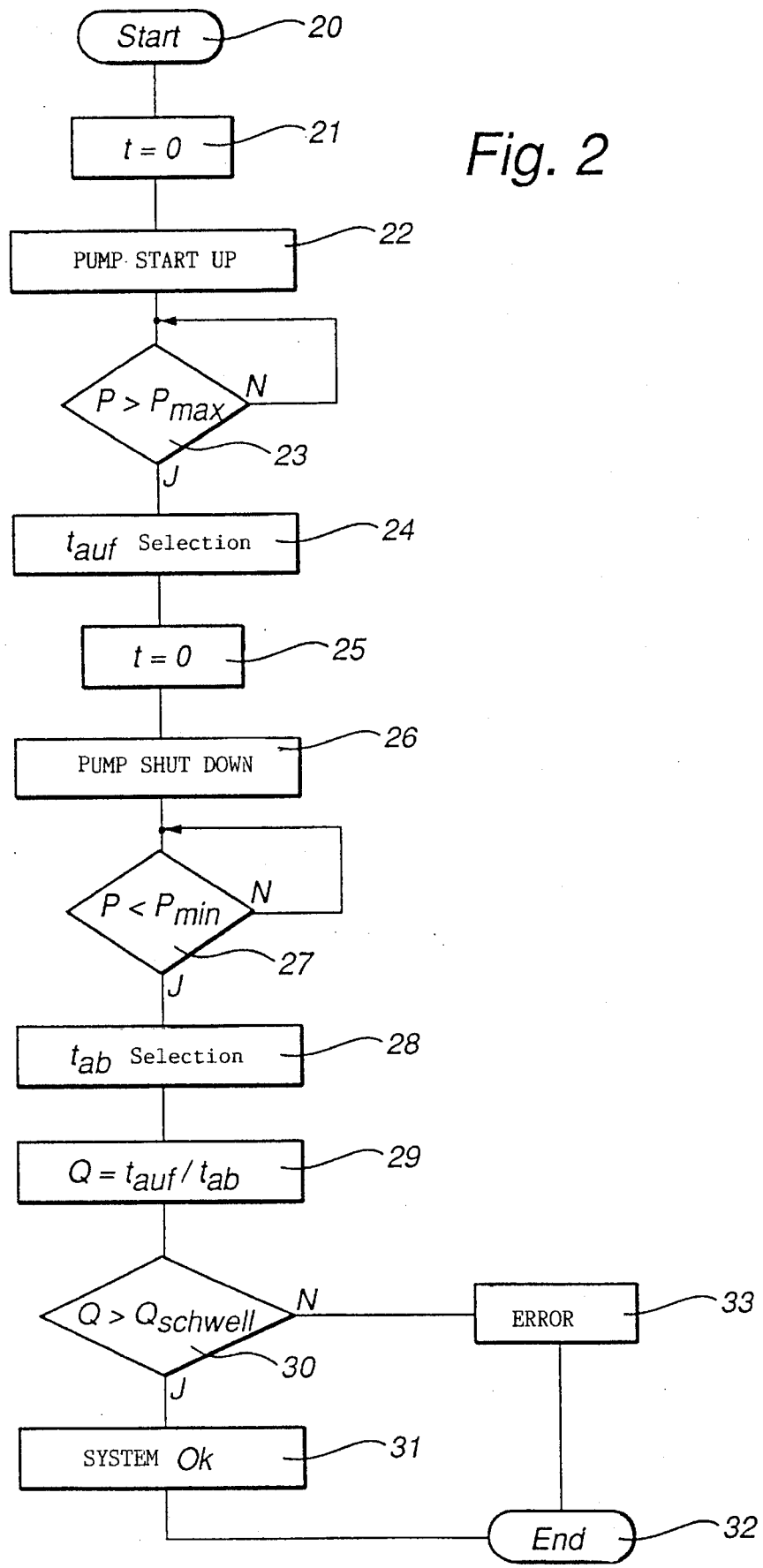
FIG. 2 shows the procedural steps employed for leak testing utilizing the arrangement according to claim 1.

When performing a leak test with the testing apparatus 11, the procedure described below in detail on the basis of FIG. 2 may be followed. But also other known procedures may be utilized.

After start-up or the testing procedure in block 20, a time count is initiated in block 21. Then, in block 22, the pump is started. A pressure sensor in the testing apparatus 11 constantly measures the pressure p effective in the tank venting system. This actual pressure p is compared in block 23 with a predetermined pressure $p_{max}$. As long as the pressure p effective in the venting system does not exceed the predetermined pressure $p_{max}$, the measuring procedure is returned to the beginning of block 23. When the predetermined pressure $p_{max}$ has been reached the procedure moves on to block 24 where the time $t_{auf}$ is provided which was needed to establish the pressure $p_{max}$.

In block 25 a new time count is then initiated before the pump is turned off in block 26. In block 27 the actual pressure p is subsequently compared with a second predetermined pressure $p_{min}$. Again the procedure is returned to the beginning of block 27 as long as the actual pressure p exceeds the pressure $p_{min}$. Only when the pressure p falls below the pressure $p_{min}$ the procedure goes to block 28 where the time $t_{ab}$ that was needed for the decay of the pressure is read.

Then, in block 29, the quotient $t_{auf}/t_{ab}$ is calculated. This is necessary since pressure build up—as well as pressure drop gradients—are dependent on operating parameters. However, since those parameters—in contrast to on-board diagnosis—remain constant for stationary testing procedures this dependency can be eliminated by utilizing the quotient of the test values. Accordingly the procedure provides for accurate determination concerning the seal tightness of the tank venting system.

The obtained quotient Q is finally compared in block 30 with a predetermined threshold value $Q_{schwell}$. In a defective tank venting system the time $t_{auf}$ required for the build up of the pressure will be too great and the time $t_{ab}$ required for the pressure collapse will be too short. The quotient $Q=t_{auf}/t_{ab}$ will then assume a high value. With a leak-free tank venting system the pressure $p_{max}$ will be established in a short period $t_{auf}$ whereas a long period $t_{ab}$ will pass until the pressure has dropped to the value $p_{min}$ so that the quotient Q will assume a small value. If $Q<Q_{schwell}$ the test procedure goes to block 31 where a properly operating tank venting system is recognized and indicated by means of optical or acoustical signals. Then the procedure is ended in block 32. However, if the quotient Q exceeds in block 30 the threshold value $Q_{schwell}$, then the procedure goes to block 33 where a defective tank venting system is recognized and a corresponding error indication is provided. Subsequently the procedure is also ended in block 32.

It is further possible to limit in block 23 the time $t_{auf}$ required for the pressure build up to a predetermined maximum value $t_{max}$. If the predetermined maximum time $t_{max}$ has been reached before the expected pressure build up has been established, the procedure is interrupted and a corresponding error indication is given. This may happen when the leak in the tank venting system 1 is very large so that the predetermined pressure $p_{max}$ cannot ever be reached with the pump provided in the testing apparatus.

The time periods $t_{auf}$, $t_{ab}$ which are needed for the pressure build-up and the pressure collapse are dependent on the fuel temperature $T_{KS}$ and the fill level FS of the tank 2. For determination of a leak this influence however can be eliminated by the quotient formation. But if also the size of the leak present should be determined it becomes also necessary to determine the values $T_{KS}$ and FS with the aid of corresponding sensors. The size of a leak can then be determined in dependence on the quotient Q, the fuel temperature $T_{KS}$ and the tank fill level FS for example from a performance graph.

Locating a leak is generally difficult since the tank venting system is normally spread out over the whole vehicle. It is therefore proposed in accordance with the invention that colored gas is supplied to the tank venting system 1 for the pressure build up therein. By the escape of the colored gas through a possible leak such leak can then be relatively easily located.

For testing the venting system it is preferable to pressurize the venting system 1 by the pump as described. But the arrangement described is also suitable for utilizing lower than atmospheric pressures. This procedure however has the disadvantage that fuel-containing vapors are withdrawn by the pump from the tank venting system. This means that, on one hand, the pump has to be designed to withstand operation with fuel containing vapors and, on the other hand, provisions must be made for removing and storing the fuel-containing vapors.

The use of a stationary test apparatus has several advantages. First, car manufacturers can check the tank venting systems of new assembled cars at the end of the assembly line for their compliance with the legal requirements to deliver only cars with properly operating tank venting systems. The second advantage is apparent particularly during use in repair garages. If with an on-board system a leak has been indicated the owner of the vehicle will call on a repair garage. There, it is then possible to verify the results of the on-board diagnosis and to locate a leak if it exists. This is not possible with on-board diagnosis. Since the equipment required for on-board diagnosis causes substantial additional expenses for each vehicle it would be advantageous if the on-board diagnosis would be replaced by stationary procedures performed at regular intervals by repair garages or inspection stations.

What is claimed is:

1. An arrangement for determining leaks in a tank venting system of a vehicle with an internal combustion engine including:, said tank venting system comprising a fuel tank, an adsorption filter, a connecting pipe interconnecting the fuel tank with the adsorption filter, a venting pipe providing for communication of said adsorption filter with the environment, a regeneration pipe extending between said adsorption filter and an intake manifold of an internal combustion engine and including a regeneration valve for closing said regeneration pipe, said tank having a fuel filler neck and said venting pipe ending adjacent said filler neck, and a test apparatus with a pump for providing a required pressure and a test pipe with a seal sleeve for placement over said tank filler neck and the end of said venting pipe to provide for closed communication between said tank venting system and said test apparatus, said test apparatus also including a pressure sensor to determine the pressure, over time, in the tank venting system and a control device for controlling the application of pressure to said venting system and for the evaluation of the pressure values determined by said pressure sensor for determining a leak in the venting system.

2. An arrangement according to claim 1, wherein said control device includes a clock for measuring the times ($t_{auf}$, $t_{ab}$) required for a pressure build up and a pressure drop in said tank venting system to predetermined values.

3. An arrangement according to claim 1, wherein said test apparatus includes sensors for determining the temperature of fuel in the tank and for determining the fuel fill level in the tank.

4. An arrangement according to claim 1, wherein said pump is adapted to pump colored gas from a reservoir into said tank ventilation system for establishing the desired pressure level therein.

* * * * *